United States Patent
Qian et al.

(10) Patent No.: US 12,506,831 B2
(45) Date of Patent: Dec. 23, 2025

(54) MULTIMEDIA FILE DISTRIBUTION METHOD, MULTIMEDIA CONTROL METHOD, MULTIMEDIA MANAGEMENT PLATFORM, CALLER RING BACK TONE PLATFORM AND COMPUTER-READABLE STORAGE MEDIUM

(71) Applicant: ZTE CORPORATION, Guangdong (CN)

(72) Inventors: Chunxiao Qian, Guangdong (CN); Gang Li, Guangdong (CN); Peng Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 430 days.

(21) Appl. No.: 18/011,877

(22) PCT Filed: Jun. 21, 2021

(86) PCT No.: PCT/CN2021/101207
§ 371 (c)(1),
(2) Date: Dec. 21, 2022

(87) PCT Pub. No.: WO2021/259193
PCT Pub. Date: Dec. 30, 2021

(65) Prior Publication Data
US 2023/0247135 A1    Aug. 3, 2023

(30) Foreign Application Priority Data

Jun. 22, 2020   (CN) .......................... 202010575097.4

(51) Int. Cl.
*H04M 3/00*   (2024.01)
*H04M 3/42*   (2006.01)

(52) U.S. Cl.
CPC ... *H04M 3/42178* (2013.01); *H04M 3/42017* (2013.01)

(58) Field of Classification Search
CPC ..................... H04M 3/42178; H04M 3/42017
See application file for complete search history.

(56) References Cited

U.S. PATENT DOCUMENTS 7,912,198 B2 * 3/2011 Zhang .................... H04N 7/173
                                                       455/412.2
10,601,986 B1 * 3/2020 Botner ................ H04M 3/2281
(Continued)

FOREIGN PATENT DOCUMENTS

| CN | 1816077 A | 8/2006 |
| CN | 1852367 A | 10/2006 |

(Continued)

OTHER PUBLICATIONS

European Patent Office, The extended European search report issued Feb. 6, 2024 for application No. EP21828600.3.

(Continued)

*Primary Examiner* — Khai M Nguyen
(74) *Attorney, Agent, or Firm* — Li & Cai Intellectual Property (USA) Office

(57) ABSTRACT

The present disclosure relate to the field of communication technology, and provide a multimedia file distribution method, including: determining an offsite calling associated number corresponding to at least one subscriber number, with the offsite calling associated number corresponding to the subscriber number being a number of a terminal with a number of calls to the subscriber number exceeding a first threshold, and a home location of the offsite calling associated number is different from that of the subscriber number; and distributing a multimedia file associated with the subscriber number to a caller ring back tone platform of the home location of the offsite calling associated number (Continued)

corresponding to the subscriber number. The present disclosure further provides a multimedia control method, a multimedia management platform, a caller ring back tone platform, and a computer-readable storage medium.

9 Claims, 11 Drawing Sheets

(56) References Cited

U.S. PATENT DOCUMENTS

| | | | |
|---|---|---|---|
| 11,924,372 B2* | 3/2024 | Li | H04L 67/141 |
| 2007/0207782 A1* | 9/2007 | Tran | H04L 65/756 |
| | | | 455/414.1 |
| 2010/0166156 A1* | 7/2010 | Xu | H04M 3/42017 |
| | | | 379/87 |
| 2011/0143732 A1* | 6/2011 | Yang | H04M 3/42017 |
| | | | 455/414.1 |

FOREIGN PATENT DOCUMENTS

| | | | | |
|---|---|---|---|---|
| CN | 1852367 B | * | 5/2010 | |
| CN | 101873387 A | | 10/2010 | |
| CN | 102131312 A | | 7/2011 | |
| CN | 102143438 A | | 8/2011 | |
| EP | 1460824 A3 | | 6/2009 | |
| EP | 2302962 A1 | * | 3/2011 | ........ H04M 3/42017 |
| JP | 2004282609 A | | 10/2004 | |
| JP | 2007312064 A | | 11/2007 | |
| JP | 2012205049 A | | 10/2012 | |
| JP | 2012205211 A | | 10/2012 | |
| KR | 100831034 B1 | | 5/2008 | |
| WO | 2005081429 A1 | | 9/2005 | |
| WO | WO-2015188569 A1 | * | 12/2015 | .............. H04M 3/42 |
| WO | 2016135981 A1 | | 9/2016 | |

OTHER PUBLICATIONS

Japan Patent Office, First office action issued Jan. 16, 2024 for application No. JP2022-579079.
WIPO, International Search Report issued on Aug. 31, 2021.

* cited by examiner

MULTIMEDIA FILE DISTRIBUTION METHOD, MULTIMEDIA CONTROL METHOD, MULTIMEDIA MANAGEMENT PLATFORM, CALLER RING BACK TONE PLATFORM AND COMPUTER-READABLE STORAGE MEDIUM

The present disclosure claims priority from Chinese patent application No. 202010575097.4 filed with the China Patent Office on Jun. 22, 2020, the entire contents of which are incorporated herein by reference.

TECHNICAL FIELD

Embodiments of the present disclosure relate to the field of communication technology.

BACKGROUND

The caller ring back tone service is usually called subscription service, which means that when a user who subscribes to the caller ring back tone service is a called party, a ring back tone is played to a calling party. The rise of the video caller ring back tone brings new challenges to the platform construction of operators and the user experience.

SUMMARY

In an aspect, the present disclosure provides a multimedia file distribution method, including: determining an offsite calling associated number corresponding to at least one subscriber number, with the offsite calling associated number corresponding to the subscriber number being a number of a terminal with a number of calls to the subscriber number exceeding a first threshold, and a home location of the offsite calling associated number being different from that of the subscriber number corresponding to the offsite calling associated number; and distributing a multimedia file associated with the subscriber number to a caller ring back tone platform of the home location of the offsite calling associated number corresponding to the subscriber number.

In another aspect, the present disclosure provides a multimedia control method, including: sending, in response to a call request, a third signaling to a caller ring back tone platform of a home location of a calling party number, so that the caller ring back tone platform of the home location of the calling party number plays a multimedia file associated with a called party number to a terminal to which the calling party number belongs according to the third signaling, with the third signaling carrying an identifier (ID) of the multimedia file associated with the called party number and the calling party number.

In yet another aspect, the present disclosure provides a multimedia control method, including: playing, in response to a third signaling, a multimedia file associated with a called party number to a terminal to which a calling party number belongs, with the third signaling carrying the calling party number, and an identifier (ID) of a multimedia file associated with the called party number.

In still another aspect, the present disclosure provides a multimedia management platform, including: at least one processor; a memory having at least one program stored thereon, the program, when executed by the at least one processor, cause the at least one processor to implement at least one operation of the multimedia file distribution method according to the present disclosure; and at least one I/O interface connected between the at least one processor and the memory, and configured to enable information interaction between the at least one processor and the memory.

In still another aspect, the present disclosure provides a caller ring back tone platform, including: at least one processor; a memory having at least one program stored thereon, the program, when executed by the at least one processor, causes the at least one processor to implement at least one operation of the multimedia control method according to the present disclosure; and at least one I/O interface connected between the at least one processor and the memory, and configured to enable information interaction between the at least one processor and the memory.

In still another aspect, the present disclosure provides a computer-readable storage medium storing a computer program thereon, the computer program, when executed by a processor, causes at least one operation of the multimedia file distribution method according to the present disclosure, or at least one operation of the multimedia control method according to the present disclosure to be implemented.

DETAIL DESCRIPTION OF EMBODIMENTS

To improve understanding of technical solutions of the present disclosure for those skilled in the art, the multimedia file distribution method, the multimedia control method, the multimedia management platform, the caller ring back tone platform, and the computer-readable storage medium according to the present disclosure will be described below in detail in conjunction with the accompanying drawings.

Example embodiments will be described more sufficiently below with reference to the accompanying drawings, but they may be embodied in different forms and should not be construed as limited to those set forth herein. Rather, these embodiments are provided so that the present disclosure will be thorough and complete, and will fully convey the scope of the present disclosure to those skilled in the art.

Implementations of the present disclosure and features thereof may be combined with each other, as long as they are not contradictory.

As used herein, the term "and/or" includes any and all combinations of one or more of the associated listed items.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that as used herein, the terms "comprise/include" and/or "consist of . . . " specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Figure 1:
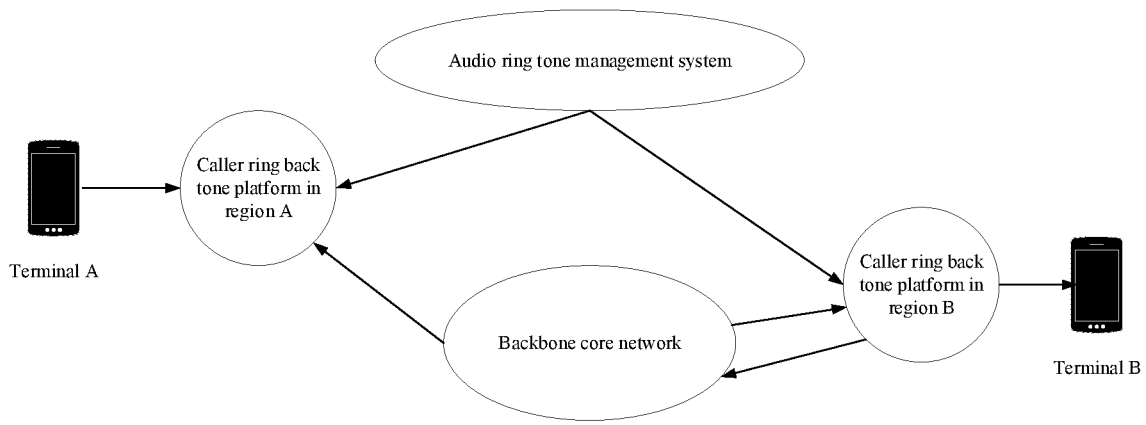
FIG. 1 is a schematic structural diagram of a caller ring back tone system.

FIG. 1 is a schematic structural diagram of a caller ring back tone system. As shown in FIG. 1, an existing caller ring back tone system includes a caller ring back tone platform and an audio ring tone management system arranged in different regions (e.g., provinces). The audio ring tone management system is configured to manage audio files of caller ring back tones and distribute the audio files of caller ring back tones to caller ring back tone platforms. In FIG. 1, a number of a terminal A belongs to a region A, and a number of a terminal B belongs to a region B. When the terminal A serving as a calling party calls the terminal B serving as a called party, the caller ring back tone platform of a home location (the region B) of the terminal B is triggered to play the caller ring back tone subscribed by the terminal B to the terminal A via a backbone core network.

It is found in researches that, in the existing caller ring back tone system shown in FIG. 1, during communication between terminals with numbers belonging to different home locations, the playing of the caller ring back tone is equivalent to playing offsite, which has a relatively high requirement on a transmission bandwidth of the backbone core network. Particularly, with the rise of the video caller ring back tone, the existing caller ring back tone system shown in FIG. 1 faces following problems: in a case where the backbone core network is unstable or a relatively large audio/video file is being played, the user experience may be deteriorated due to a transmission delay; and in the existing caller ring back tone system, the audio ring tone management system sends audio and video files of all caller ring back tones to caller ring back tone platforms in a full distribution mode, which means that each caller ring back tone platform stores the audio and video files completely, resulting in increased storage costs without improving the user experience.

Figure 2:
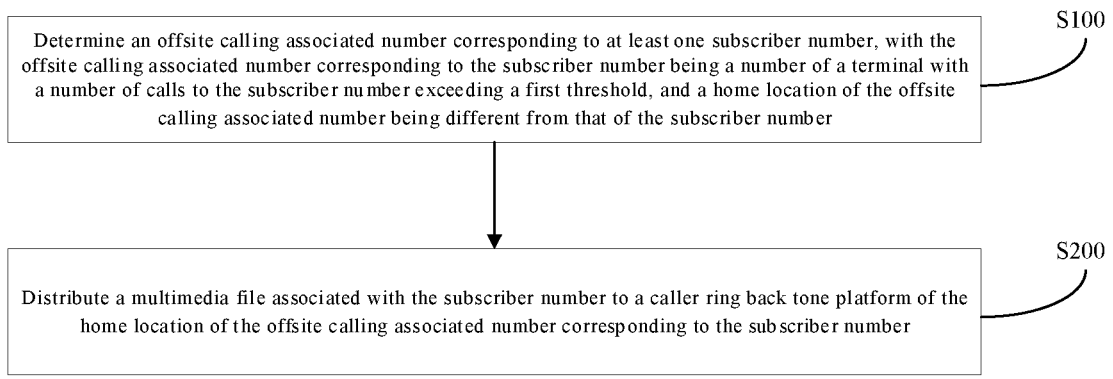
FIG. 2 is a flowchart of a multimedia file distribution method according to the present disclosure.

In view of above, referring to FIG. 2, an embodiment of the present disclosure provides a multimedia file distribution method, including: operations S100 and S200.

At operation S100, determining an offsite calling associated number corresponding to at least one subscriber number, with the offsite calling associated number corresponding to the subscriber number being a number of a terminal with a number of calls to the subscriber number exceeding a first threshold, and a home location of the offsite calling associated number being different from that of the subscriber number corresponding to the offsite calling associated number.

At operation S200, distributing a multimedia file associated with the subscriber number to a caller ring back tone platform of the home location of the offsite calling associated number corresponding to the subscriber number.

The embodiment of the present disclosure is intended to distribute, through a certain multimedia file distribution policy, the multimedia file of the caller ring back tone subscribed by the called party to the caller ring back tone platform of the home location of the calling party, so that, during the calling party calls the called party, the caller ring back tone subscribed by the called party can be played for the calling party by the caller ring back tone platform of the home location of the calling party.

It should be noted that, in the present disclosure, the subscriber number in operation S100 is regarded as a called party number, and the offsite calling associated number corresponding to the subscriber number is regarded as a calling party number. The subscriber number is a number of a user who has subscribed to the caller ring back tone service; and the multimedia file associated with the subscriber number is a multimedia file corresponding to the caller ring back tone subscribed by the subscriber number.

It should be further noted that, for each subscriber number, there may be zero, one, or more offsite calling associated numbers corresponding thereto, which is not limited in the present disclosure.

In the present disclosure, as a calling or called role of the subscriber number changes, the offsite calling associated number corresponding to the subscriber number may change accordingly. By performing operation S100 periodically or aperiodically, the offsite calling associated number corresponding to the subscriber number changed can be determined, and in operation S200, the multimedia file associated with the subscriber number is distributed to the caller ring back tone platform of the home location of the offsite calling associated number changed. That is, in the present disclosure, the policy for the multimedia management platform to distribute the multimedia file may be dynamically adjusted according to changing of the calling or called role of the subscriber number.

In the present disclosure, the multimedia management platform distributes the multimedia file to the caller ring back tone platform in a non-full distribution mode, which means that, after the multimedia file associated with the called party number is distributed to the caller ring back tone platform of the home location of the calling party number in operation S200, the multimedia file associated with the called party number that is frequently called during a local terminal serving as the calling party is stored in the caller ring back tone platform, and in an implementation, the multimedia file corresponding to the caller ring back tone subscribed by the local terminal is further stored in the caller ring back tone platform. The multimedia management platform will not distribute all multimedia files to each caller ring back tone platform any more.

It should be noted that, in the present disclosure, since the multimedia file associated with the called party number that is frequently called during the local terminal serving as the calling party, and the multimedia file corresponding to the caller ring back tone subscribed by the local terminal, are stored in the caller ring back tone platform, during the terminal serving as the calling party calling the terminal serving as the called party, the caller ring back tone subscribed by the terminal serving as the called party can be played to the terminal serving as the calling party by the caller ring back tone platform of the home location of the calling party number in most cases; and in other cases, if the multimedia file associated with the called party number is not stored in the caller ring back tone platform of the home location of the calling party, the caller ring back tone subscribed by the called party terminal may be played to the terminal serving as the calling party by the caller ring back tone platform of the home location of the called party number. Therefore, in the present disclosure, the multimedia management platform distributes the multimedia file to the caller ring back tone platform in a non-full distribution mode, so that a normal operation of the caller ring back tone service can be ensured, and in most cases, the caller ring back tone subscribed by the terminal serving as the called party can be played to the terminal serving as the calling party by the caller ring back tone platform of the home location of the calling party number.

It should be further noted that, in the present disclosure, the multimedia file may be an audio file, a video file, or any other type of multimedia file, which is not limited in the present disclosure.

In the multimedia file distribution method according to the present disclosure, the multimedia management platform distributes the multimedia file associated with the called party number to the caller ring back tone platform of the home location of the calling party number that frequently calls the called party number, so that in most cases, the caller ring back tone subscribed by the terminal serving as the called party can be played to the terminal serving as the calling party by the caller ring back tone platform of the home location of the calling party number, and in a case where the multimedia file associated with the called party number is not stored in the caller ring back tone platform of the home location of the calling party, the caller ring back tone subscribed by the terminal serving as the called party may be played to the terminal serving as the calling party by the caller ring back tone platform of the home location of the called party number, so that a normal operation of the caller ring back tone service can be ensured in a case where the multimedia management platform distributes the multimedia file to the caller ring back tone platform in a non-full distribution mode. In addition, with the non-full distribution mode, a number of multimedia files to be stored by the caller ring back tone platform are reduced, and a storage space of the caller ring back tone platform is saved, and in a case where the caller ring back tone subscribed by the terminal serving as the called party is played to the terminal serving as the calling party by the caller ring back tone platform of the home location of the calling party number, a load on a backbone network caused by offsite playing is avoided, operation and maintenance costs of an operator for the backbone network are reduced, and furthermore, since a transmission distance between the caller ring back tone platform playing the caller ring back tone and the terminal serving as the calling party is shortened, an effect of playing the caller ring back tone and the user experience are improved.

In the present disclosure, the offsite calling associated number corresponding to the subscriber number may be determined according to a static or dynamic distribution policy, and the multimedia file associated with the subscriber number is distributed to the caller ring back tone platform of the home location of the offsite calling associated number corresponding to the subscriber number. The static distribution policy includes determining, according to the calling or called role of the subscriber number locally stored at the multimedia management platform, the offsite calling associated number corresponding to the subscriber number, and distributing the multimedia file associated with the subscriber number to the caller ring back tone platform of the home location of the offsite calling associated number corresponding to the subscriber number. The dynamic distribution policy includes receiving the calling or called role of the subscriber number sent from the caller ring back tone platform, determining the offsite calling associated number corresponding to the subscriber number in real time, and distributing the multimedia file associated with the subscriber number in real time to the caller ring back tone platform of the home location of the offsite calling associated number corresponding to the subscriber number.

In an implementation, the multimedia management platform distributes the multimedia file according to the static distribution policy. The multimedia management platform locally stores the subscriber number and calling or called information of the subscriber number, and determines the offsite calling associated number corresponding to the subscriber number based on the subscriber number and the calling or called information of the subscriber number locally stored.

Figure 3:
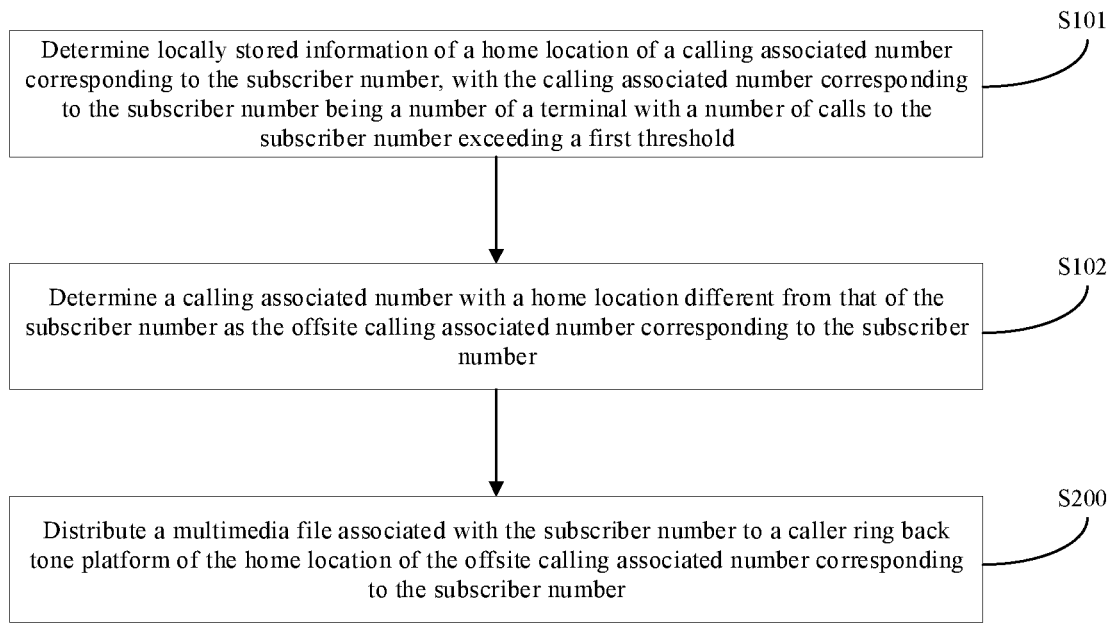
FIG. 3 is a flowchart of partial operations in a multimedia file distribution method according to the present disclosure.

Accordingly, referring to FIG. 3, the operation S100 may include operations S101 and S102.

At operation S101, determining locally stored information of a home location of a calling associated number corresponding to the subscriber number, with the calling associated number corresponding to the subscriber number being the number of the terminal with the number of calls to the subscriber number exceeding the first threshold.

At operation S102, determining the calling associated number with a home location different from that of the subscriber number as the offsite calling associated number corresponding to the subscriber number.

It should be noted that, in the present disclosure, the multimedia management platform locally stores at least one subscriber number and the calling or called information of the subscriber number, and subscriber numbers may belong to different home locations or belong to a same home location, which is not limited in the present disclosure.

In the present disclosure, each multimedia file in the multimedia management platform has a unique identifier (ID) to be distinguished from others. In an implementation, the multimedia management platform stores a correspondence relationship between subscriber numbers and identifiers (IDs) of multimedia files, so that each subscriber number is to be associated with the multimedia file corresponding to the caller ring back tone subscribed by the subscriber number.

Figure 4:
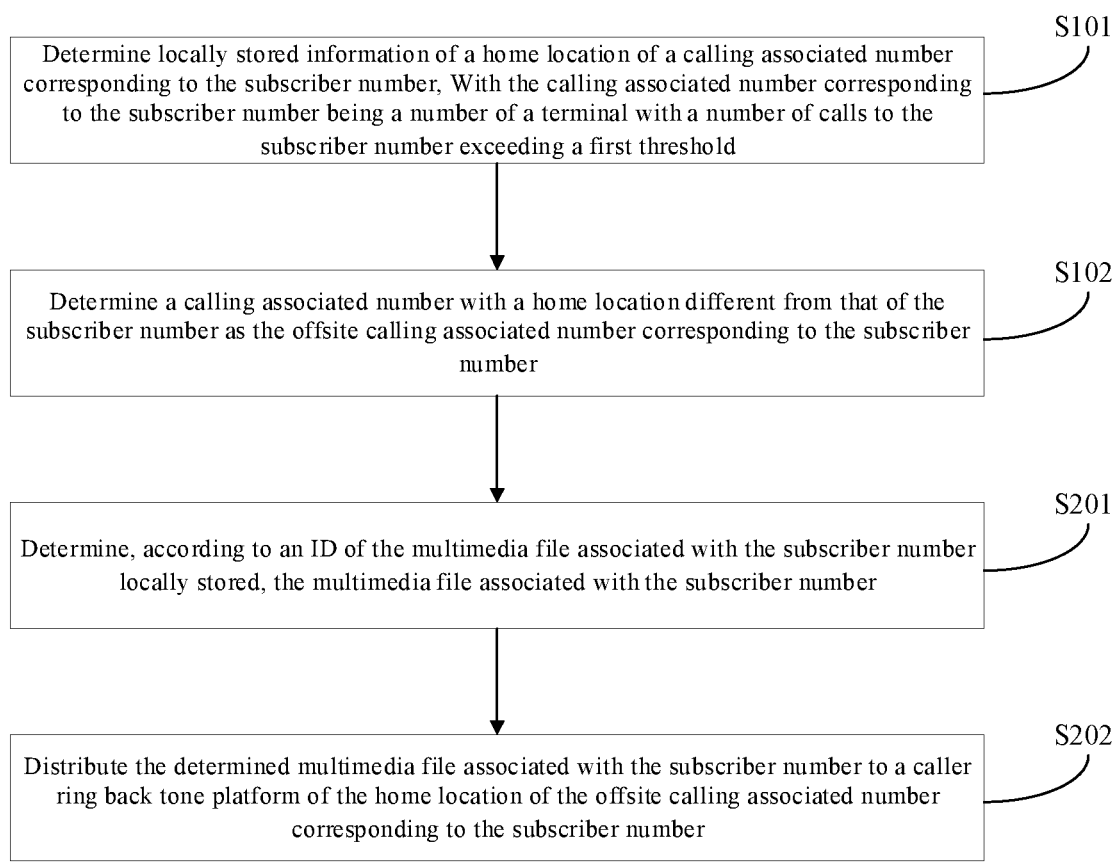
FIG. 4 is a flowchart of partial operations in a multimedia file distribution method according to the present disclosure.

Accordingly, in an implementation, referring to FIG. 4, the operation S200 may include operations S201 and S202.

At operation S201, determining, according to the ID of the multimedia file associated with the subscriber number locally stored, the multimedia file associated with the subscriber number.

At operation S202, distributing the determined multimedia file associated with the subscriber number to the caller ring back tone platform of the home location of the offsite calling associated number corresponding to the subscriber number.

In an implementation, the multimedia management platform distributes the multimedia file according to the dynamic distribution policy. The multimedia management platform may receive the subscriber number and the calling or called information of the subscriber number sent from the caller ring back tone platform, and determine in real time, based on the subscriber number and the calling or called information of subscriber number received, the offsite calling associated number corresponding to the subscriber number.

Figure 5:
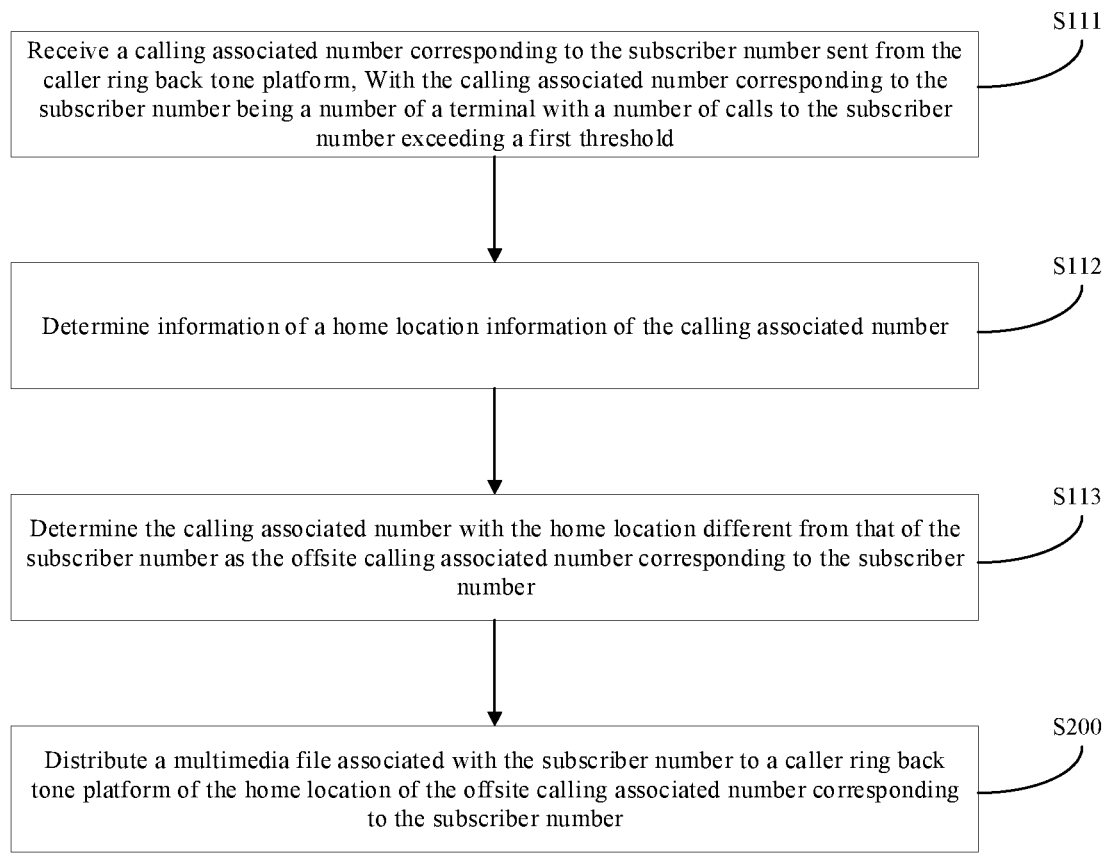
FIG. 5 is a flowchart of partial operations in a multimedia file distribution method according to the present disclosure.

Accordingly, referring to FIG. 5, the operation S100 may include operations S111, S112 and S113.

At operation S111, receiving a calling associated number corresponding to the subscriber number sent from the caller ring back tone platform, with the calling associated number corresponding to the subscriber number being the number of the terminal with the number of calls to the subscriber number exceeding the first threshold.

At operation S112, determining information of a home location of the calling associated number.

At operation S113, determining the calling associated number with a home location different from that of the subscriber number as the offsite calling associated number corresponding to the subscriber number.

It should be noted that, in the present disclosure, each caller ring back tone platform sends at least one subscriber number and the calling or called information corresponding to the subscriber number each time, and subscriber numbers sent from each caller ring back tone platform belong to the same home location.

As described above, in the present disclosure, each multimedia file in the multimedia management platform has a unique ID to be distinguished from others. In an implementation, the caller ring back tone platform sends the correspondence relationship between the subscriber numbers and the IDs of the multimedia files associated with the subscriber numbers to the multimedia management platform, and the multimedia management platform distributes, according to the correspondence relationship received, the multimedia file corresponding to the subscriber number to the caller ring back tone platform of the home location of the offsite calling associated number corresponding to the subscriber number.

Figure 6:
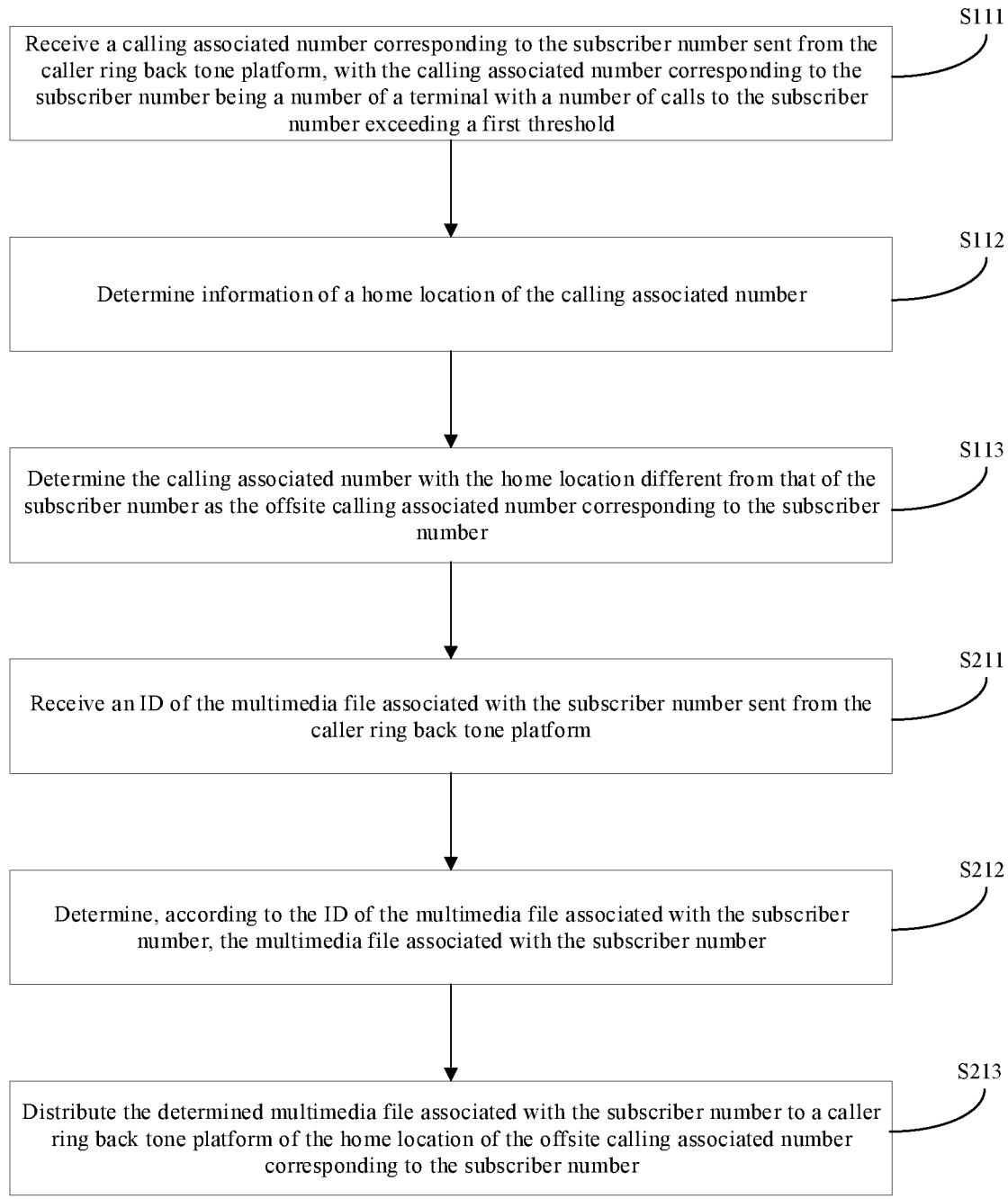
FIG. 6 is a flowchart of partial operations in a multimedia file distribution method according to the present disclosure.

Accordingly, referring to FIG. 6, the operation S200 may include operations S211, S212 and S213.

At operation S211, receiving an ID of the multimedia file associated with the subscriber number sent from the caller ring back tone platform.

At operation S212, determining, according to the ID of the multimedia file associated with the subscriber number, the multimedia file associated with the subscriber number.

At operation S213, distributing the determined multimedia file associated with the subscriber number to the caller ring back tone platform of the home location of the offsite calling associated number corresponding to the subscriber number.

In the present disclosure, the multimedia management platform can distribute, in response to a signaling, indicating to distribute the multimedia file, sent from the caller ring back tone platform, a particular multimedia file to a particular caller ring back tone platform.

Figure 7:
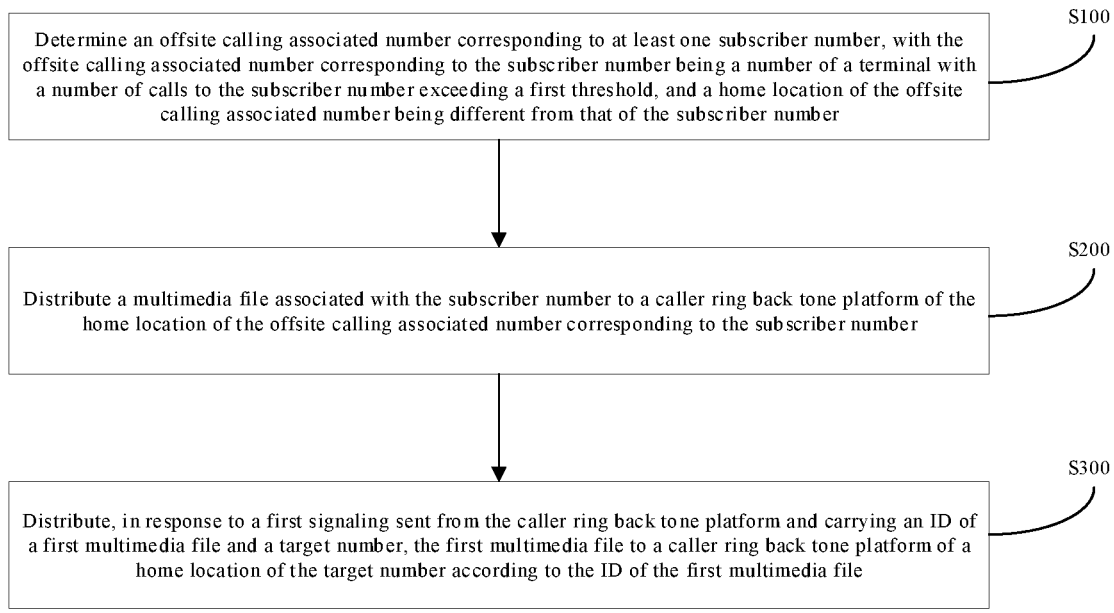
FIG. 7 is a flowchart of partial operations in a multimedia file distribution method according to the present disclosure.

Accordingly, in an implementation, referring to FIG. 7, the multimedia file distribution method may further include operation S300.

At operation S300, distributing, in response to a first signaling sent from the caller ring back tone platform and carrying an ID of a first multimedia file and a target number, the first multimedia file to the caller ring back tone platform of the home location of the target number according to the ID of the first multimedia file.

As described above, in the present disclosure, during the terminal serving as the calling party calling the terminal serving as the called party, the caller ring back tone subscribed by the terminal serving as the called party is played to the terminal serving as the calling party by the caller ring back tone platform of the home location of the calling party number. That is, during the terminal serving as the calling party calling the terminal serving as the called party, the caller ring back tone platform of the home location of the called party number notifies the caller ring back tone platform of the home location of the calling party number to play the caller ring back tone subscribed by the terminal serving as the called party to the terminal serving as the calling party. In a case where the multimedia file associated with the called party number is not stored in the caller ring back tone platform of the home location of the calling party number, and the caller ring back tone subscribed by the called party terminal cannot be played, the caller ring back tone platform of the home location of the called party number notifies the multimedia management platform to distribute the multimedia file corresponding to the caller ring back tone subscribed by the called party terminal to the caller ring back tone platform of the home location of the calling party number. In such case, the caller ring back tone platform of the home location of the called party number is the caller ring back tone platform that sends the first signaling in operation S300, the calling party number is the target number in operation S300, and the caller ring back tone platform of the home location of the calling party number is the caller ring back tone platform of the home location of the target number in operation S300. In such case, by distributing the multimedia file in operation S300, during the terminal serving as the calling party calling the terminal serving as the called party, a probability of playing the caller ring back tone subscribed by the terminal serving as the called party to the terminal serving as the calling party by the caller ring back tone platform of the home location of the calling party number is increased.

In the present disclosure, the multimedia management platform may further distribute, in response to a signaling, indicating to distribute the multimedia file, sent from the caller ring back tone platform, a particular multimedia file to all caller ring back tone platforms of home locations of all offsite calling associated numbers corresponding to all subscriber numbers of the home location of the caller ring back tone platform.

Figure 8:
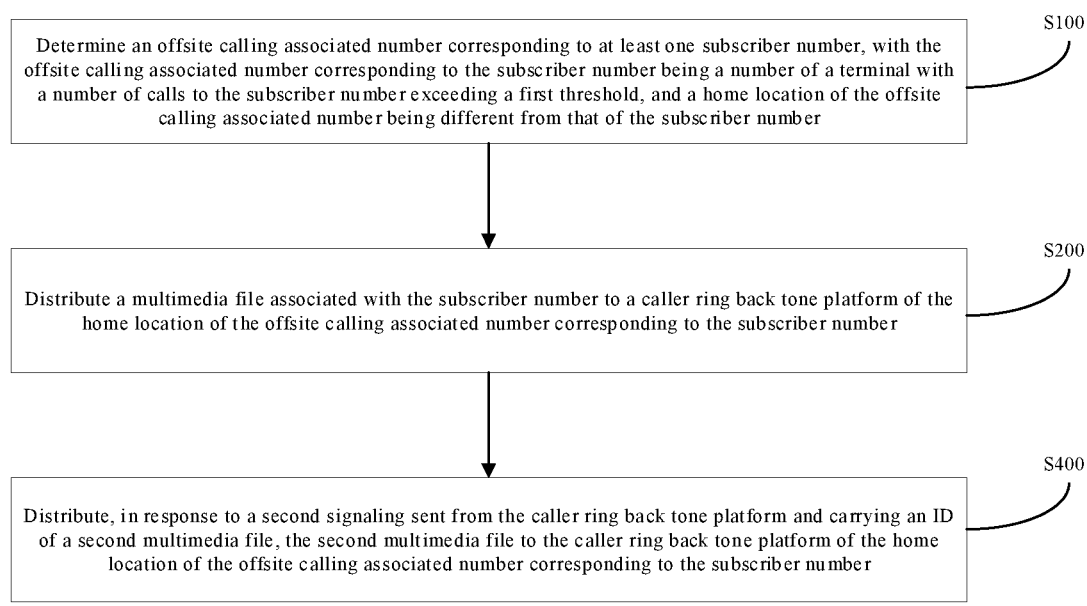
FIG. 8 is a flowchart of partial operations in a multimedia file distribution method according to the present disclosure.

Accordingly, in an implementation, referring to FIG. 8, the multimedia file distribution method may further include operation S400.

At operation S400, distributing, in response to a second signaling sent from the caller ring back tone platform and carrying an ID of a second multimedia file, the second multimedia file to the caller ring back tone platform of the home location of the offsite calling associated number corresponding to the subscriber number, with the subscriber number being at the home location of the caller ring back tone platform that sent the second signaling.

In an implementation, the second signaling in operation S400 is sent from the caller ring back tone platform of the home location of the called party number according to preferences, habits, and the like of a user, for setting the caller ring back tone, at a location where the caller ring back tone platform is located, the second multimedia file is a multimedia file corresponding to the caller ring back tone conforming to the preferences or habits of the user at the location where the caller ring back tone platform is located, and in operation S400, the second media file is distributed to the caller ring back tone platform of the home location of the calling party number. By distributing the multimedia file in operation S400, during the terminal serving as the calling party calling the terminal serving as the called party, the probability of playing the caller ring back tone subscribed by the terminal serving as the called party to the terminal serving as the calling party by the caller ring back tone platform of the home location of the calling party number is increased. It has found in researches that hot topics, hot videos and music, and the like are associated with preferences of users for subscribing the caller ring back tone. In other words, the hot videos and music are more likely to be set as the caller ring back tone by a user. In the present disclosure, the multimedia management platform may further distribute multimedia files according to indexes such as hot topics and hot videos and music.

Figure 9:
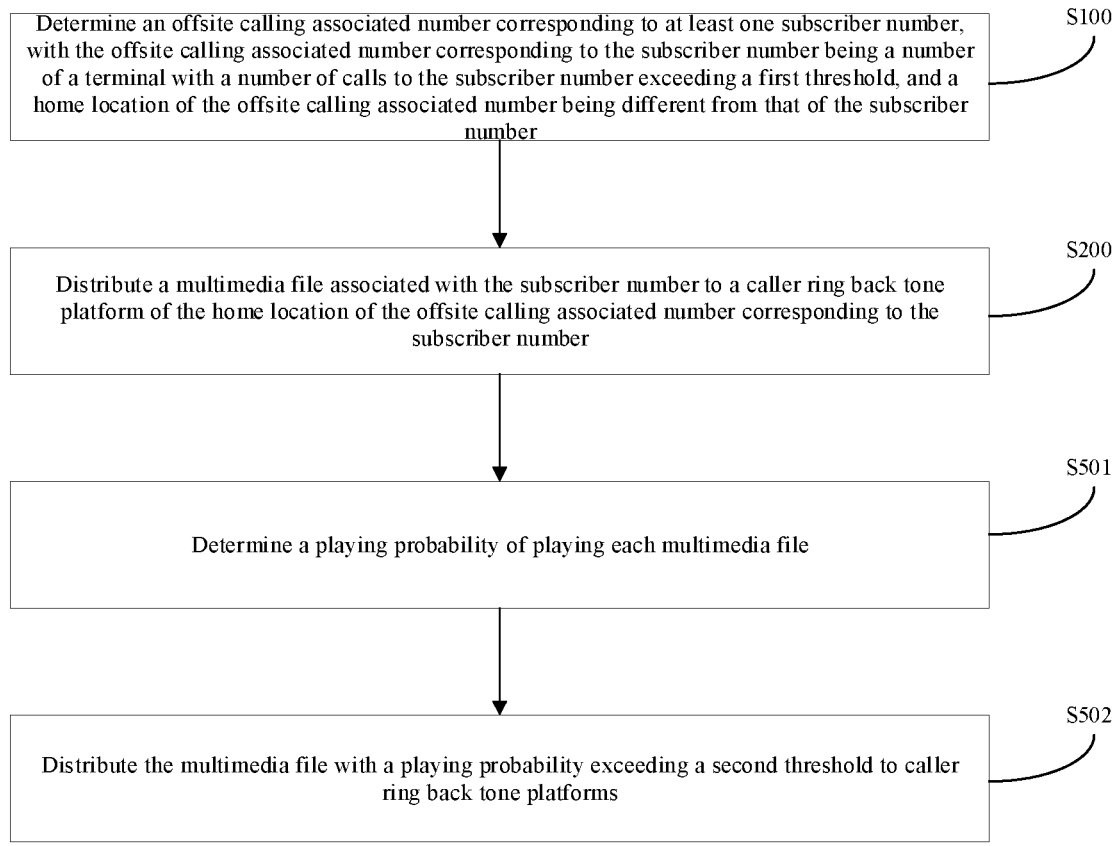
FIG. 9 is a flowchart of partial operations in a multimedia file distribution method according to the present disclosure.

Accordingly, in an implementation, referring to FIG. 9, the multimedia file distribution method may further include operations S501 and S502.

At operation S501, determining a playing probability of playing each multimedia file.

At operation S502, distributing the multimedia file with the playing probability exceeding a second threshold to caller ring back tone platforms.

It should be noted that, in the present disclosure, the playing probability of playing the multimedia file is determined according to indexes such as hot topics and hot videos and music, and the playing probability of playing the multimedia file is positively correlated with a correlation degree between the caller ring back tone and the hot topics, the hot videos or music.

By distributing the multimedia file in operations S501 to S502, during the terminal serving as the calling party calling the terminal serving as the called party, the probability of playing the caller ring back tone subscribed by the terminal serving as the called party to the terminal serving as the calling party by the caller ring back tone platform of the home location of the calling party number is increased.

Figure 10:
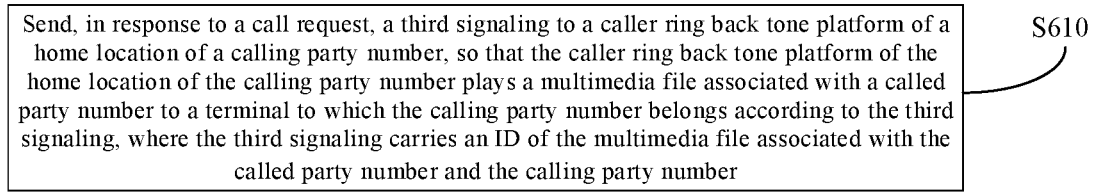
FIG. 10 is a flowchart of a multimedia control method according to the present disclosure.

Referring to FIG. 10, an embodiment of the present disclosure further provides a multimedia control method, including operation S610.

At operation S610, sending, in response to a call request, a third signaling to a caller ring back tone platform of a home location of a calling party number, so that the caller ring back tone platform of the home location of the calling party number plays a multimedia file associated with a called party number to a terminal to which the calling party number belongs according to the third signaling, with the third signaling carrying an ID of the multimedia file associated with the called party number and the calling party number.

As described above, in the present disclosure, during the terminal serving as the calling party calling the terminal serving as the called party, the caller ring back tone subscribed by the terminal serving as the called party is played to the terminal serving as the calling party by the caller ring back tone platform of the home location of the calling party number. In other words, during the terminal serving as the calling party calling the terminal serving as the called party, the caller ring back tone platform of the home location of the called party number notifies the caller ring back tone platform of the home location of the calling party number to play the caller ring back tone subscribed by the terminal serving as the called party to the terminal serving as the calling party.

It should be noted that, in the present disclosure, according to the multimedia file distribution method in the present disclosure, the multimedia management platform distributes the multimedia file to the caller ring back tone platform in a non-full distribution mode, the multimedia file associated with the called party number that is frequently called during a local terminal serving as the calling party is stored in the caller ring back tone platform, and in an implementation, a multimedia file corresponding to the caller ring back tone subscribed by the local terminal is further stored in the caller ring back tone platform. During the calling party terminal calling the called party terminal, the caller ring back tone subscribed by the terminal serving s the called party can be played to the terminal serving as the calling party by the caller ring back tone platform of the home location of the calling party number in most cases; and in other cases, if the multimedia file associated with the called party number is not stored in the caller ring back tone platform of the home location of the calling party, the caller ring back tone subscribed by the terminal serving as the called party may be played to the terminal serving as the calling party by the caller ring back tone platform of the home location of the called party number. Therefore, the multimedia control method according to the present disclosure can ensure a normal operation of the caller ring back tone service, and in most cases, the caller ring back tone subscribed by the terminal serving as the called party can be played to the terminal serving as the calling party by the caller ring back tone platform of the home location of the calling party number.

According to the multimedia control method in the present disclosure, during the terminal serving as the calling party calling the terminal serving as the called party, the caller ring back tone platform of the home location of the called party number notifies the caller ring back tone platform of the home location of the calling party number to play the caller ring back tone subscribed by the terminal serving as the called party to the terminal serving as the calling party. Moreover, the multimedia file associated with the called party number that is frequently called during the local terminal serving as the calling party, and the multimedia file corresponding to the caller ring back tone subscribed by the local terminal, are stored in the caller ring back tone platform, so that in most cases, the caller ring back tone subscribed by the terminal serving as the called party can be played to the terminal serving as the calling party by the caller ring back tone platform of the home location of the calling party number, and in a case where the multimedia file associated with the called party number is not stored in the caller ring back tone platform of the home location of the calling party, the caller ring back tone subscribed by the terminal serving as the called party may be played to the terminal serving as the calling party by the caller ring back tone platform of the home location of the called party number, so that a normal operation of the caller ring back tone service can be ensured, and a load on a backbone network caused by offsite playing is avoided, operation and maintenance costs of an operator for the backbone network are reduced. Furthermore, since a transmission distance between the caller ring back tone platform playing the caller ring back tone and the terminal serving as the calling party is shortened, an effect of playing the caller ring back tone and the user experience are improved.

In an implementation, in a case where the caller ring back tone subscribed by the terminal serving as the called party cannot be played due to the multimedia file associated with the called party number being not stored in the caller ring back tone platform of the home location of the calling party number, the caller ring back tone subscribed by the terminal serving as the called party is to be played to the terminal serving as the calling party by the caller ring back tone platform of the home location of the called party number. Meanwhile, the caller ring back tone platform of the home location of the called party number notifies the multimedia management platform to distribute the multimedia file corresponding to the caller ring back tone subscribed by the terminal serving as the called party to the caller ring back tone platform of the home location of the calling party number.

Figure 11:
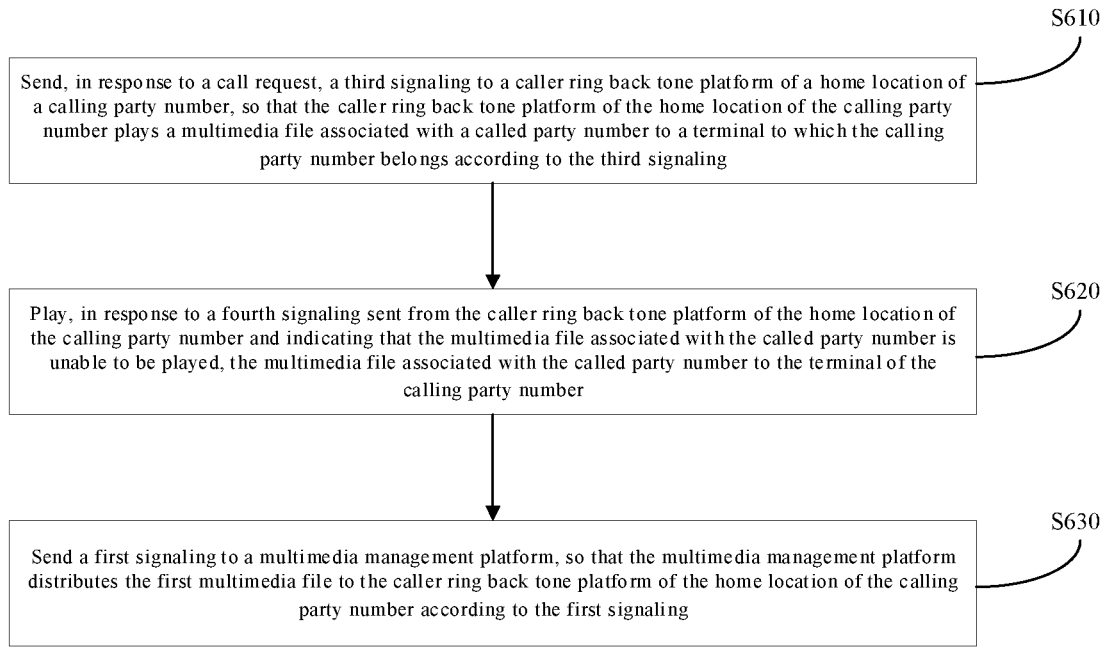
FIG. 11 is a flowchart of partial operations in a multimedia control method according to the present disclosure.

Accordingly, referring to FIG. 11, the multimedia control method may further include operations S620 and S630.

At operation S620, playing, in response to a fourth signaling sent from the caller ring back tone platform of the home location of the calling party number and indicating that the multimedia file associated with the called party number is unable to be played, the multimedia file associated with the called party number to the terminal corresponding to the calling party number.

At operation S630, sending a first signaling to the multimedia management platform, with the first signaling carrying an ID of a first multimedia file and the calling party number, and the first multimedia file being a multimedia file associated with the called party number, so that the multimedia management platform distributes the first multimedia file to the caller ring back tone platform of the home location of the calling party number according to the first signaling.

With operations S620 to S630, during the terminal serving as the calling party calling the terminal serving as the called party, the probability of playing the caller ring back tone subscribed by the terminal serving as the called party to the terminal serving as the calling party by the caller ring back tone platform of the home location of the calling party number is increased.

It should be noted that, in the present disclosure, operation S610 is to be performed in a case where the calling party number and the called party number belong to different home locations.

Figure 12:
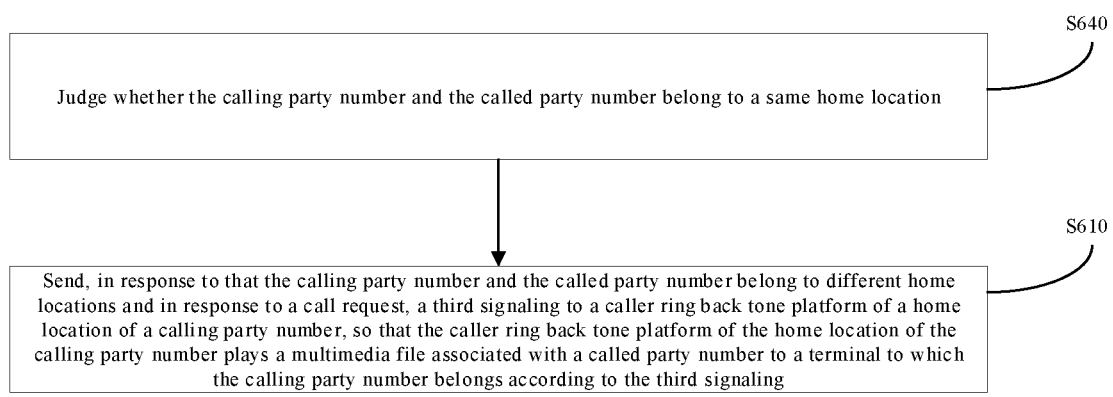
FIG. 12 is a flowchart of partial operations in a multimedia control method according to the present disclosure.

Accordingly, referring to FIG. 12, before operation S610, the multimedia control method may further include operation S640.

At operation S640, judging whether the calling party number and the called party number belong to a same home location.

In a case where the calling party number and the called party number belong to different home locations, operation S610 is to be performed.

In the present disclosure, the caller ring back tone platform may perform aggregation analysis on a local subscriber number to obtain the calling party number which frequently calls the local subscriber number, and then sends the subscriber number and the calling or called information of the subscriber number to the multimedia management platform, so that the multimedia management platform determines the offsite calling associated number corresponding to the subscriber number according to the subscriber number and the calling or called information of the subscriber number received.

Figure 13:
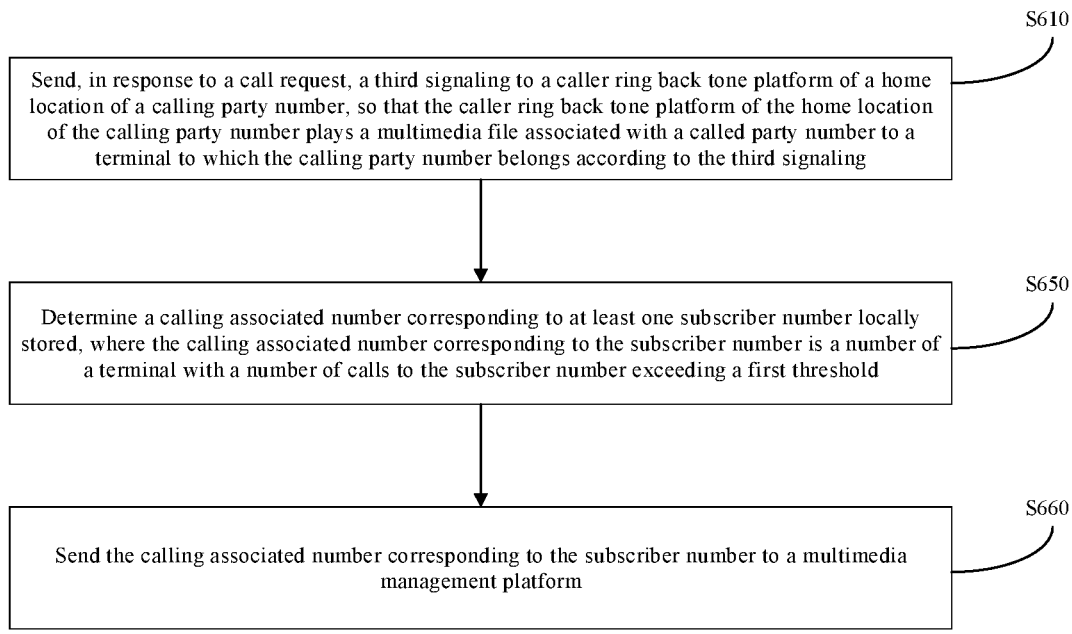
FIG. 13 is a flowchart of partial operations in a multimedia control method according to the present disclosure.

Accordingly, in an implementation, referring to FIG. 13, the multimedia control method may further include operations S650 and S660.

At operation S650, determining a calling associated number corresponding to at least one subscriber number locally stored, with the calling associated number corresponding to the subscriber number being a number of a terminal with a number of calls to the subscriber number exceeding a first threshold.

At operation S660, sending the calling associated number corresponding to the subscriber number to the multimedia management platform.

As described above, in the present disclosure, each multimedia file in the multimedia management platform has a unique ID to be distinguished from others. In an implementation, the caller ring back tone platform sends a correspondence relationship between subscriber numbers and IDs of multimedia files associated with the subscriber numbers to the multimedia management platform, so that the multimedia management distributes, according to the correspondence relationship received, the multimedia file associated with the subscriber number to the caller ring back tone platform of the home location of the offsite calling associated number corresponding to the subscriber number.

Figure 14:
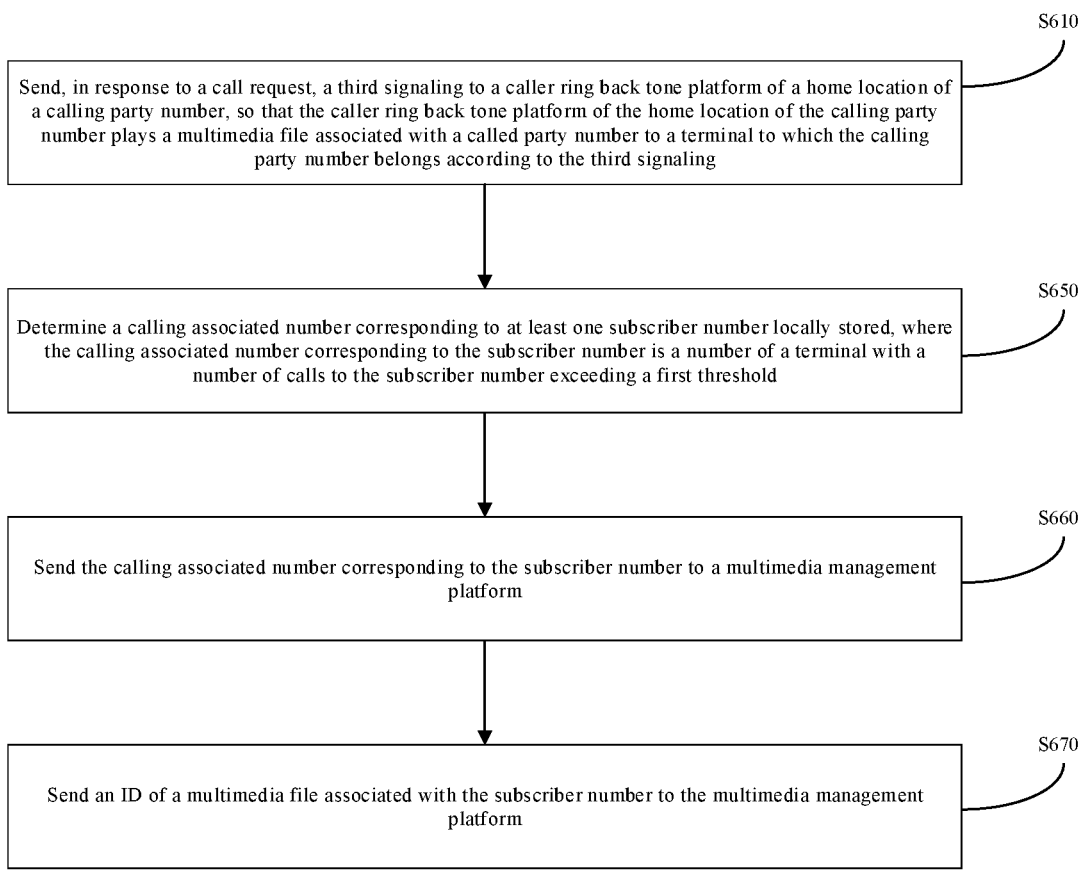
FIG. 14 is a flowchart of partial operations in a multimedia control method according to the present disclosure.

Accordingly, referring to FIG. 14, the multimedia control method may further include operation S670.

At operation S670, sending an ID of the multimedia file associated with the subscriber number to the multimedia management platform.

In the present disclosure, the caller ring back tone platform may determine, according to preferences, habits, and the like of a user, for setting the caller ring back tone, at a location where the caller ring back tone platform is located, the multimedia file corresponding to the caller ring back tone conforming to the preferences or habits of the user at the location of the caller ring back tone platform, and send a signaling to the multimedia management platform, so that, after receiving the ID of the multimedia file corresponding to the caller ring back tone conforming to the preferences or habits of the user at the location of the caller ring back tone platform, the multimedia management platform distributes the multimedia file to the caller ring back tone platform of the home location of the offsite calling associated number corresponding to the subscriber number, with the subscriber number being at the location where the caller ring back tone platform that sent the ID of the multimedia file is located.

Figure 15:
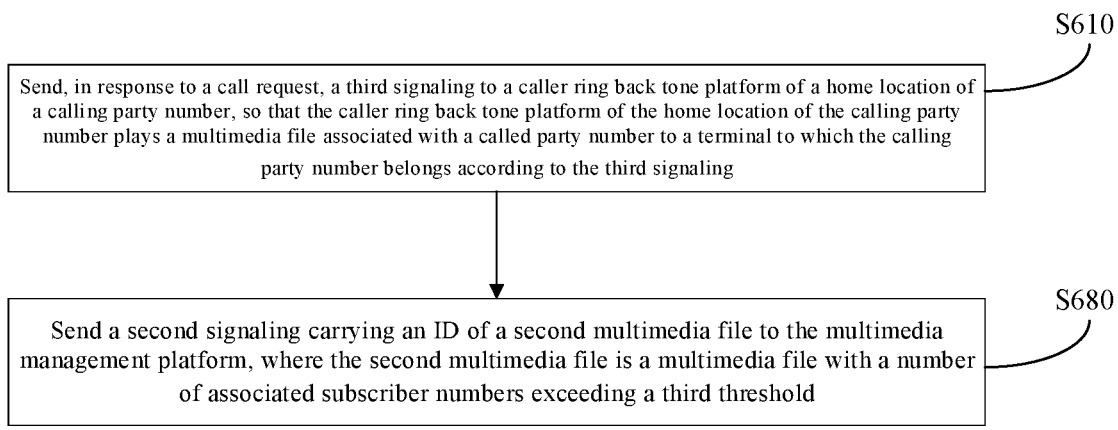
FIG. 15 is a flowchart of partial operations in a multimedia control method according to the present disclosure.

Accordingly, in an implementation, referring to FIG. 15, the multimedia control method may further include operation S680.

At operation S680, sending a second signaling carrying an ID of a second multimedia file to the multimedia management platform, with the second multimedia file being a multimedia file with a number of subscriber numbers associated with the multimedia file exceeding a third threshold.

With operation S680, during the terminal serving as the calling party calling the terminal serving as the called party, the probability of playing the multimedia file associated with the called party number to the calling party by the caller ring back tone platform of the home location of the calling party is improved.

Figure 16:
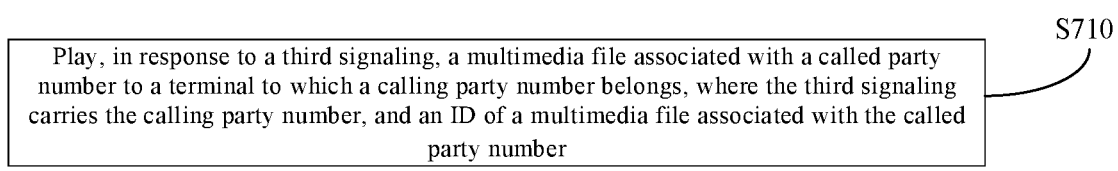
FIG. 16 is a flowchart of a multimedia control method according to the present disclosure.

Referring to FIG. 16, an embodiment of the present disclosure further provides a multimedia control method, including operation S710.

At operation S710, playing, in response to a third signaling, a multimedia file associated with a called party number to a terminal to which a calling party number belongs, with the third signaling carrying the calling party number, and an ID of the multimedia file associated with the called party number.

As described above, in the present disclosure, during the terminal serving as the calling party terminal calling the terminal serving as the called party, the caller ring back tone subscribed by the terminal serving as the called party is played to the terminal serving as the calling party by the caller ring back tone platform of the home location of the calling party number. In other words, during the terminal serving as the calling party calling the terminal serving as the called party, the caller ring back tone platform of the home location of the calling party number plays, in response to a notification from the caller ring back tone platform of the home location of the called party number, the caller ring back tone subscribed by the terminal serving as the called party to the terminal serving as the calling party.

It should be noted that, in the present disclosure, according to the multimedia file distribution method in the present disclosure, the multimedia management platform distributes the multimedia file to the caller ring back tone platform in a non-full distribution mode, the multimedia file associated with the called party number that is frequently called during a local terminal serving as the calling party is stored in the caller ring back tone platform, and in an implementation, a multimedia file corresponding to the caller ring back tone subscribed by the local terminal is further stored in the caller ring back tone platform. During the terminal serving as the calling party calling the terminal serving as the called party, the caller ring back tone subscribed by the terminal serving as the called party can be played to the terminal serving as the calling party by the caller ring back tone platform of the home location of the calling party number in most cases; and in other cases, if the multimedia file associated with the called party number is not stored in the caller ring back tone platform of the home location of the calling party, the caller ring back tone subscribed by the terminal serving as the called party may be played to the terminal serving as the calling party by the caller ring back tone platform of the home location of the called party number.

According to the multimedia control method in the present disclosure, during the terminal serving as the terminal the calling party calling the terminal serving as the called party, the caller ring back tone platform of the home location of the calling party number plays, in response to a notification from the caller ring back tone platform of the home location of the called party number, the caller ring back tone subscribed by the terminal serving as the called party to the terminal serving as the calling party. Moreover, the multimedia file associated with the called party number that is frequently called during the local terminal serving as the calling party, and the multimedia file corresponding to the caller ring back tone subscribed by the local terminal, are stored in the caller ring back tone platform, so that in most cases, the caller ring back tone subscribed by the terminal serving as the called party can be played to the terminal serving as the calling party by the caller ring back tone platform of the home location of the calling party number, and in a case where the multimedia file associated with the called party number is not stored in the caller ring back tone platform of the home location of the calling party, the caller ring back tone subscribed by the terminal serving as the called party may be played to the terminal serving as the calling party by the caller ring back tone platform of the home location of the called party number, so that a normal operation of the caller ring back tone service can be ensured, and a load on a backbone network caused by offsite playing is avoided, operation and maintenance costs of an operator for the backbone network are reduced. Furthermore, since a transmission distance between the caller ring back tone platform playing the caller ring back tone and the terminal serving as the calling party is shortened, an effect of playing the caller ring back tone and the user experience are improved.

Figure 17:
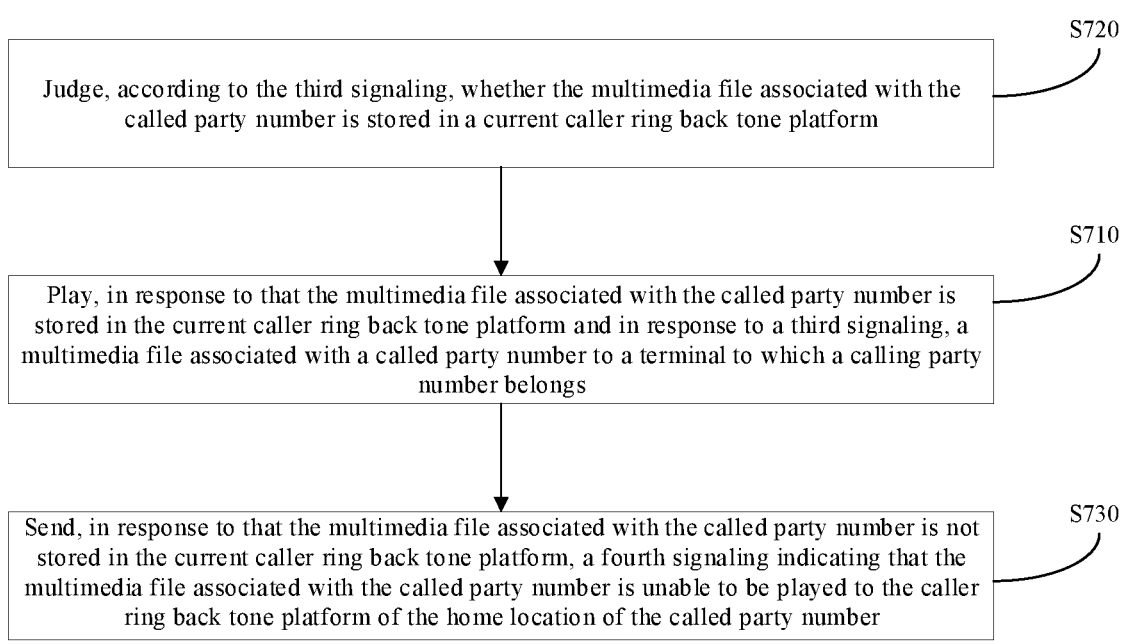
FIG. 17 is a flowchart of partial operations in a multimedia control method according to the present disclosure.

In an implementation, referring to FIG. 17, before operation S710, the multimedia control method may further include operation S720.

At operation S720, judging, according to the third signaling, whether the multimedia file associated with the called party number is stored in a current caller ring back tone platform. In a case where the multimedia file associated with the called party number is stored in the current caller ring back tone platform, operation S710 is to be performed.

In a case where the multimedia file associated with the called party number is not stored in the current caller ring back tone platform, at operation S730, a fourth signaling indicating that the multimedia file associated with the called party number is unable to be played is sent to the caller ring back tone platform of the home location of the called party number.

Figure 18:
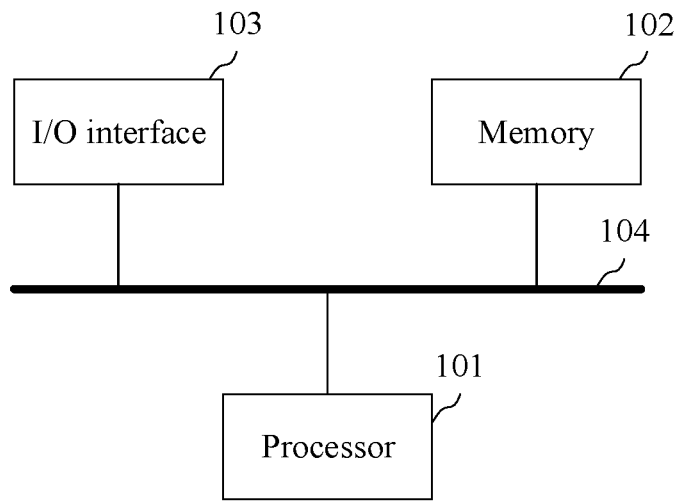
FIG. 18 is a block diagram of a multimedia management platform according to the present disclosure.

Referring to FIG. 18, an embodiment of the present disclosure further provides a multimedia management platform, including: at least one processor 101; a memory 102 storing at least one program thereon, the at least one program, when executed by the at least one processor 101, causes the at least one processor 101 to implement at least one operation of the multimedia file distribution method according to the present disclosure; and at least one I/O interface (read/write interface) 103 connected between the at least one processor 101 and the memory 102, and configured to enable information interaction between the at least one processor 101 and the memory 102.

The processor 101 is a device with a data processing capability, including but not limited to a central processing unit (CPU), or the like; the memory 102 is a device with a data storage capability, including but not limited to a random access memory (RAM, in particular a synchronous dynamic random-access memory (SDRAM), a data direction register (DDR), etc.), a read only memory (ROM), an electrically erasable programmable read only memory (EEPROM) or a flash memory (FLASH); and the I/O interface 103 is connected between the processor 101 and the memory 102 to implement information interaction between the processor 101 and the memory 102, and includes, but is not limited to, a bus or the like.

In an implementation, the processor 101, the memory 102, and the I/O interface 103 are interconnected via a bus 104, and further connected to other components of the multimedia management platform.

The multimedia control method has been described in detail above, and is not repeated here.

Figure 19:
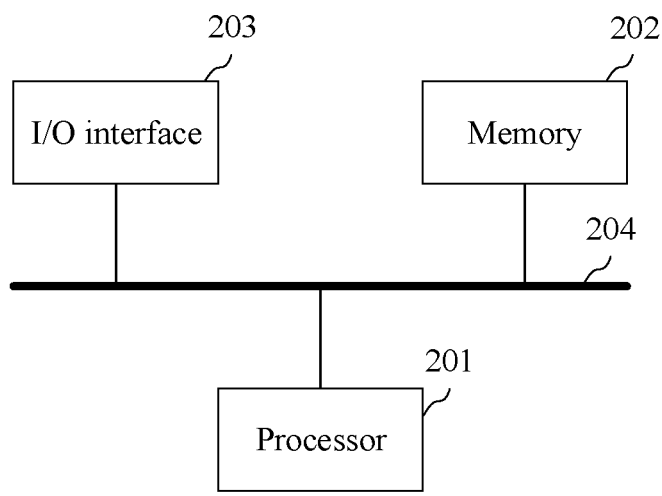
FIG. 19 is a block diagram of a caller ring back tone platform according to the present disclosure.

Referring to FIG. 19, an embodiment of the present disclosure further provides a caller ring back tone platform, including: at least one processor 201; a memory 202 storing at least one program thereon, the at least one program, when executed by the at least one processor 201, causes the at least one processor 201 to implement at least one operation of the multimedia control method according to the present disclosure; and at least one I/O interface 203 connected between the at least one processor 201 and the memory 202 and configured to enable information interaction between the at least one processor 201 and the memory 202.

The processor 201 is a device with a data processing capability, including but not limited to a central processing unit (CPU), or the like; the memory 202 is a device with a data storage capability, including but not limited to, a random access memory (RAM, more specifically SDRAM, DDR, etc.), a read only memory (ROM), an electrically erasable programmable read only memory (EEPROM) or a flash memory (FLASH); and the I/O interface 203 is connected between the processor 201 and the memory 202 to implement information interaction between the processor 201 and the memory 202, and includes, but is not limited to, a bus or the like.

In an implementation, the processor 201, the memory 202, and the I/O interface 203 are interconnected via a bus 204, and further connected to other components of the caller ring back tone platform.

The multimedia control method according to the present disclosure has been described in detail above, and is not repeated here.

Figure 20:
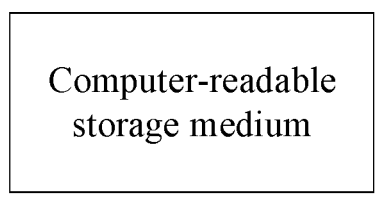
FIG. 20 is a block diagram of a computer-readable storage medium according to the present disclosure.

Referring to FIG. 20, an embodiment of the present disclosure further provides a computer-readable storage medium storing a computer program thereon, the computer program, when executed by a processor, causes at least one operation of the multimedia file distribution method according to the present disclosure, or at least one operation of the multimedia control method according to the present disclosure to be implemented.

The multimedia file distribution method and the multimedia control method according to the present disclosure have been described in detail above, and are not repeated here.

To improve understanding of the technical solutions of the present disclosure for those skilled in the art, the technical solutions of the present disclosure will be further described in detail below with the help of accompanying drawings and specific examples.

First Example

Figure 21:
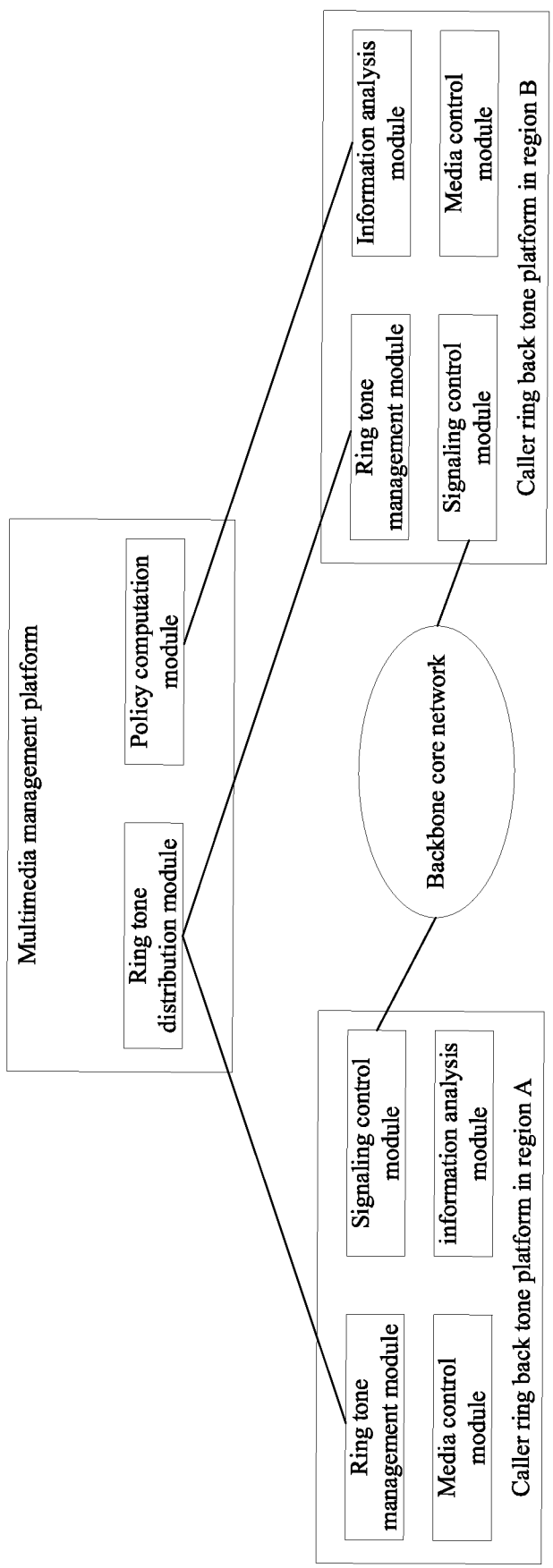
FIG. 21 is a schematic diagram of a caller ring back tone system according to the present disclosure.

FIG. 21 is a schematic diagram of an implementation of a caller ring back tone system according to the present disclosure. In FIG. 21, the home location of the calling party number is a region A, and the home location of the called party number is a region B.

As shown in FIG. 21, the multimedia management platform includes a ring tone distribution module and a policy computation module. The ring tone distribution module is configured to distribute the multimedia file to the caller ring back tone platform, and the policy computation module is configured to generate a multimedia file distribution policy.

As shown in FIG. 21, the caller ring back tone platform includes a ring tone management module, a signaling control module, a media control module, and an information analysis module. The ring tone management module is configured to receive and manage the multimedia file distributed by the multimedia management platform; the signaling control module is configured to transmit signaling among different caller color ring platforms, where signaling control modules of the different caller ring platforms are connected through a backbone core network; the media control module is configured to control playing of the multimedia file; and the information analysis module is configured to perform aggregation analysis on a local subscriber number to obtain a calling party number which frequently calls the local subscriber number, and generate calling associated information. The information analysis module is further configured to analyze and determine, according to preferences, habits and the like of a local user for setting the caller ring back tone, the multimedia file with a higher probability of being set as the caller ring back tone by the local user, and then send an ID of the multimedia file determined to the policy computation module of the multimedia management platform so that the multimedia management platform distributes the multimedia file to the caller ring back tone platform of the home location of the offsite calling associated number corresponding to the subscriber number with a home location being the location where the caller ring back tone platform that sent the ID of the multimedia file is located.

It should be noted that FIG. 21 merely shows a case where the caller ring back tone platform in the region B includes the information analysis module, but the caller ring back tone platform in the region A does not include the information analysis module. It will be appreciated that in a scenario where the home location of the calling party number is the region B and the home location of the called party number is the region A, the caller ring back tone platform in the region A also includes the information analysis module.

Second Example

In this example, as shown in FIG. 21, the caller ring back tone platform adopted here is the caller ring back tone platform in the first example. In FIG. 21, the home location of the calling party number is the region A, and the home location of the called party number is the region B.

The multimedia management platform operates in a non-full distribution mode, and distributes the multimedia file to the caller ring back tone platform in the region A according to a static distribution policy. The caller ring back tone platform in the region A receives the ring tone synchronized by the multimedia management platform, and stores information such as the calling party number, the ID of the ring tone and the like. When a terminal in the region A calls a number of a terminal in the region B, the signaling control module of the caller ring back tone platform in the region B notifies the signaling control module of the caller ring back tone platform in the region A to play the multimedia file associated with the called party number. The multimedia file associated with the called party number is stored in the caller ring back tone platform in the region A, and the media control model in the caller ring back tone platform in the region A plays the multimedia file to the calling party number with the home location being the region A.

It should be noted that in the second example, the static distribution policy includes that: the policy computation module obtains, according to calling group information stored locally in the multimedia management platform, information of the calling party number corresponding to a number with a home location being the region B, and an ID of the multimedia file associated with the calling party number, then determines an offsite calling associated number (i.e., a number with a home location being the region A) according to information of the home location of the calling party number corresponding to the number with the home location being the region B, and directionally distributes the multimedia file associated with the number with the home location being the region B to the caller ring back tone platform in the region A through the ring tone distribution module. The ring tone distribution module distributes, according to hot ring tones published, multimedia files corresponding to the hot ring tones to caller ring back tone platforms respectively.

Third Example

In a third example, as shown in FIG. 21, the caller ring back tone platform adopted here is the caller ring back tone platform in the first example. In FIG. 21, the home location of the calling party number is the region A, and the home location of the called party number is the region B.

The multimedia management platform operates in a non-full distribution mode. Caller ring back tone platforms in the region A and the region B receive multimedia files synchronized by the multimedia management platform. During a terminal in the region A calls a number of a terminal in the region B, the signaling control module of the caller ring back tone platform in the region B notifies the signaling control module of the caller ring back tone platform in the region A to play the multimedia file associated with the called party number. In a case where the multimedia file associated with the called party number is not stored in the caller ring back tone platform in the region A, the signaling control module of the caller ring back tone platform in the region A notifies the caller ring back tone platform in the region A, the media control model of the caller ring back tone platform in the region B plays the multimedia file associated with the called party number to the calling party number with the home location being the region A. The caller ring back tone platform in the region B sends a message to the multimedia management platform, the message including information of the calling party, an ID of the multimedia file associated with the called party number, and the like. The policy computation module in the multimedia management platform extracts the information of the calling party, the ID of the multimedia file associated with the called party number, and the like from the message received, and distributes the multimedia file associated with the called party number to the caller ring back tone platform in the region A through the ring tone distribution module. In a case where the terminal in the region A calls the number of the terminal in the region B again, and the multimedia file associated with the called party number is played to the terminal in the region A by the caller ring back tone platform in the region A.

Fourth Example

In a fourth example, as shown in FIG. 21, the caller ring back tone platform adopted here is the caller ring back tone platform in the first example. In FIG. 21, the home location of the calling party number is the region A, and the home location of the called party number is the region B.

During a terminal in the region A calls a terminal in the region B, the signaling control module of the caller ring back tone platform in the region B sends information relating to calling and called parties to the information analysis module of the caller ring back tone platform in the region B. The information analysis module of the caller ring back tone platform in the region B stores the information relating to the calling and called parties. The information analysis module of the caller ring back tone platform in the region B performs periodical smart analysis on the information relating to the calling and called parties, for example, performs aggregation according to the called party number to obtain the calling party number which frequently calls the called party number. The information analysis module of the caller ring back tone platform in the region B sends the information of the calling party, the ID of the multimedia file associated with the called party number, and the like to the policy computation module of the multimedia management platform. The policy computation module in the multimedia management platform judges whether the calling party number and the called party number belong to a same home location. In a case where the calling party number and the called party number belong to different home locations, the policy computation module of the multimedia management platform distributes, according to the information of the calling party, the ID of the multimedia file associated with the called party number, and the like, the multimedia file associated with the called party number to the caller ring back tone platform in the region A through the ring tone distribution module. In a case where the terminal in the region A calls the number of the terminal in the region B again, the multimedia file associated with the called party number is played to the terminal in the region A by the caller ring back tone platform in the region A.

Those of ordinary skill in the art will appreciate that all or some operations of the method described above, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software to be executed by a processor, such as a CPU, a digital signal processor or microprocessor, or implemented as hardware, or implemented as an integrated circuit, such as an application specific integrated circuit. Such software may be distributed on a computer-readable storage medium which may include a computer storage medium (or non-transitory medium) or a communication medium (or transitory medium). As well known to those of ordinary skill in the art, the computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made without departing from the scope of the present disclosure as set forth in the appended claims.

What is claimed is:

1. A multimedia file distribution method, comprising:
determining an offsite calling associated number corresponding to at least one subscriber number, with the offsite calling associated number corresponding to the subscriber number being a number of a terminal with a number of calls to the subscriber number exceeding a first threshold, and a home location of the offsite calling associated number being different from a home location of the subscriber number corresponding to the offsite calling associated number; and
distributing a multimedia file associated with the subscriber number to a caller ring back tone platform of the home location of the offsite calling associated number corresponding to the subscriber number,
wherein the method further comprises:
determining a playing probability of the multimedia file, wherein the playing probability of the multimedia file is positively correlated with a correlation degree between the caller ring back tone and hot topics, videos or music; and
distributing the multimedia file with the playing probability exceeding a second threshold to the caller ring back tone platform.

2. The multimedia file distribution method according to claim 1, wherein the determining an offsite calling associated number corresponding to at least one subscriber number comprising:
determining locally stored information of a home location of a calling associated number corresponding to the subscriber number, with the calling associated number corresponding to the subscriber number being the number of the terminal with the number of calls to the subscriber number exceeding the first threshold; and
determining the calling associated number with the home location different from that of the subscriber number as the offsite calling associated number corresponding to the subscriber number.

3. The multimedia file distribution method according to claim 2, wherein the distributing a multimedia file associated with the subscriber number to a caller ring back tone platform of the home location of the offsite calling associated number corresponding to the subscriber number comprises:
determining, according to an identifier (ID) of the multimedia file associated with the subscriber number locally stored, the multimedia file associated with the subscriber number; and
distributing the determined multimedia file associated with the subscriber number to the caller ring back tone platform of the home location of the offsite calling associated number corresponding to the subscriber number.

4. The multimedia file distribution method according to claim 1, wherein the determining an offsite calling associated number corresponding to at least one subscriber number comprising:
receiving a calling associated number corresponding to the subscriber number sent from the caller ring back tone platform, with the calling associated number corresponding to the subscriber number being the number of the terminal with the number of calls to the subscriber number exceeding the first threshold;
determining information of a home location of the calling associated number; and
determining the calling associated number with the home location different from that of the subscriber number as the offsite calling associated number corresponding to the subscriber number.

5. The multimedia file distribution method according to claim 4, wherein the distributing a multimedia file associated with the subscriber number to a caller ring back tone platform of the home location of the offsite calling associated number corresponding to the subscriber number comprises:
receiving an identifier (ID) of the multimedia file associated with the subscriber number sent from the caller ring back tone platform;
determining, according to the ID of the multimedia file associated with the subscriber number, the multimedia file associated with the subscriber number; and
distributing the determined multimedia file associated with the subscriber number to the caller ring back tone platform of the home location of the offsite calling associated number corresponding to the subscriber number.

6. The multimedia file distribution method according to claim 1, further comprising:
distributing, in response to a first signaling sent from the caller ring back tone platform and carrying an identifier (ID) of a first multimedia file and a target number, the first multimedia file to a caller ring back tone platform of a home location of the target number according to the ID of the first multimedia file.

7. The multimedia file distribution method according to claim 1, further comprising:
distributing, in response to a second signaling sent from the caller ring back tone platform and carrying an identifier (ID) of a second multimedia file, the second multimedia file to the caller ring back tone platform of the home location of the offsite calling associated number corresponding to the subscriber number, with the subscriber number being at a home location of a caller ring back tone platform that sent the second signaling.

8. A multimedia management platform, comprising:
at least one processor;
a memory storing at least one program thereon, the at least one program, when executed by the at least one processor, causes the at least one processor to implement the multimedia file distribution method according to claim 1; and
at least one I/O interface connected between the at least one processor and the memory, and configured to enable information interaction between the at least one processor and the memory.

9. A non-transitory computer-readable storage medium storing a computer program thereon, the computer program, when executed by a processor, causes the multimedia file distribution method according to claim 1 to be implemented.

* * * * *